United States Patent
Chugun

(10) Patent No.: US 7,681,278 B2
(45) Date of Patent: Mar. 23, 2010

(54) FLOOR CLEANING APPARATUS

(76) Inventor: Saburo Chugun, 4-41-14, Yoyogi, Shibuya-ku, Tokyo, 151-0053 (JP)

(*) Notice: Subject to any disclaimer, the term of this patent is extended or adjusted under 35 U.S.C. 154(b) by 0 days.

(21) Appl. No.: 12/011,950

(22) Filed: Jan. 29, 2008

(65) Prior Publication Data

US 2008/0134459 A1    Jun. 12, 2008

Related U.S. Application Data

(63) Continuation of application No. PCT/JP2007/050114, filed on Jan. 10, 2007.

(30) Foreign Application Priority Data

Aug. 4, 2006    (JP)    ............................... 2006-213661

(51) Int. Cl.
   *A47L 7/00* (2006.01)
   *A47L 5/00* (2006.01)
(52) U.S. Cl. ........................... 15/322; 15/320; 15/340.2
(58) Field of Classification Search ........... 15/320–322, 15/340.1–340.4
   See application file for complete search history.

(56) References Cited

U.S. PATENT DOCUMENTS

| 4,819,676 | A  | * | 4/1989  | Blehert et al. | .................. | 134/21 |
| 7,060,137 | B2 | * | 6/2006  | Davis et al.   | .................... | 134/21 |
| 2003/0159231 | A1 | * | 8/2003 | Oh             | ............................... | 15/320 |
| 2004/0262434 | A1 | * | 12/2004 | Buckner       | ...................... | 239/754 |

FOREIGN PATENT DOCUMENTS

| CN | 2131892  | Y |   | 5/1993 |
| GB | 2030040  | A | * | 4/1980 |
| JP | 1121030  | A |   | 5/1989 |
| JP | 349053   |   |   | 5/1991 |
| JP | 395855   |   |   | 9/1991 |
| JP | 55058    |   |   | 1/1993 |
| JP | 975427   | A |   | 3/1997 |
| JP | 1015466  | A |   | 1/1998 |

(Continued)

OTHER PUBLICATIONS

Office Action issued by Japanese Patent Office in connection with Japanese Patent Application No. 2006-213661, filed Aug. 4, 2006.

(Continued)

*Primary Examiner*—Bryan R Muller
(74) *Attorney, Agent, or Firm*—John P. White; Cooper & Dunham LLP

(57) ABSTRACT

An apparatus main body having wheels and configured to run on a floor includes an electrolysis device, which electrolyzes a cleaning water to alkaline water and acid water. A pressurizing pump selectively sucks and pressurizes the alkaline water or acid water obtained by electrolysis by the electrolysis device. A spray nozzle mechanism sprays the cleaning water comprising the alkaline water or acid water pressurized by the pressurizing pump on the floor. A suction nozzle is mounted behind the spray nozzle mechanism in the apparatus main body and is opened to the floor. A suction mechanism sucks the cleaning water sprayed on the floor together with a contaminant. A reservoir tank, which is mounted in the apparatus main body, stores the sucked cleaning water together with the contaminant.

4 Claims, 4 Drawing Sheets

FOREIGN PATENT DOCUMENTS

| | | |
|---|---|---|
| JP | 10-057282 | 3/1998 |
| JP | 200310088 A | 1/2003 |
| JP | 200424058 A | 1/2004 |
| JP | 2004-357793 A | 12/2004 |

OTHER PUBLICATIONS

International Search Report issued by the International Searching Authority (ISA/US) on Jan. 25, 2007 in connection with International Application No. PCT/JP2007/050114.

Oct. 23, 2009 Chinese Official Action (with English translation) in connection with counterpart Chinese Patent Application No. 2007800008711.

Office Action issued by Japanese Patent Office in connection with Japanese Patent Application No. 2006-213661, filed Aug. 4, 2006.

International Search Report issued by the International Searching Authority (ISA/US) on Jan. 25, 2007 in connection with International Application No. PCT/JP2007/050114.

\* cited by examiner

FLOOR CLEANING APPARATUS

CROSS-REFERENCE TO RELATED APPLICATIONS

This is a Continuation Application of PCT Application No. PCT/JP2007/050114, filed Jan. 10, 2007, which was published under PCT Article 21(2) in Japanese.

This application is based upon and claims the benefit of priority from prior Japanese Patent Application No. 2006-213661, filed Aug. 4, 2006, the entire contents of which are incorporated herein by reference.

BACKGROUND OF THE INVENTION

1. Field of the Invention

The present invention relates to a floor cleaning apparatus to clean a floor of a large area, for example, a lobby or passageway of a building or apartment house, or underground passageway.

2. Description of the Related Art

A floor of a large area, for example, a lobby or passageway of a building or apartment house or underground passageway, is generally cleaned by a cleaning service staff in the following procedures. First, a weakly acid, neutral or alkaline cleaner is applied by a mop to the floor to be cleaned. Then, the floor, to which the cleaner has been applied, is cleaned by a rotary polisher. After the cleaning by the polisher, tap water is sprayed on the floor through a hose connected to a tap, thereby washing the dirty water and the cleaner after the cleaning. Then, the water on the floor is vacuumed by a wet vacuum (vacuum suction machine), and thereafter the water remaining on the floor is wiped by a mop. Thus, the cleaning of the floor is completed.

However, in the case where the floor is cleaned by a rotary polisher, the polisher brush and the floor material are inevitably worn. Since the polisher brush is made of synthetic resin fiber, industrial waste, such as fiber cuttings generated by the wear of the fiber, is discharged to sewerage together with the dirty water and the cleaner. In addition, since the flooring is made of vinyl-based material, wear of the flooring generates material cuttings. Thus, each time the floor is cleaned, a great amount of industrial waste is discharged to sewerage together with the dirty water and the cleaner, resulting in environmental pollution.

Under those circumstances, the applicant filed an application for patent of a floor cleaning machine as disclosed in Jpn. Pat. Appln. KOKAI Publication No. 2004-357793. The floor cleaning machine comprises a cart-type cleaner main body, which can move on the floor, and the main body has a high-pressure steam spray, which sprays high-pressure steam on the floor directly to clean the floor. The water on the floor sprayed from the high-pressure steam spray is collected together with a contaminant. Further, the water and the contaminant are sucked by a suction pump mounted on the floor cleaning machine, and the sucked water is stored in a water reservoir tank mounted on the floor cleaning machine.

In the floor cleaning machine described above, the high-pressure steam (50° C.-80° C.) is introduced in a nozzle box, and directly sprayed on the floor through a number of steam spray nozzles. When the high-pressure steam is directly sprayed on the floor, the contaminant adhering to the floor is removed from the floor and caused to float. In this state, the user moves the floor cleaning machine forward while pushing a handle, so that the contaminant is collected by a water suction device together with the water on the floor, sucked and collected in the water reservoir tank.

BRIEF SUMMARY OF THE INVENTION

As described above, according to Jpn. Pat. Appln. KOKAI Publication No. 2004-357793, the contaminant adhering to the floor is removed from the floor by the high-pressure steam directly sprayed on the floor from the steam spray nozzles of the nozzle box. Then, when the user moves the floor cleaning machine forward on the floor while pushing the handle, the contaminant is collected by the water suction device together with the water. However, the contaminant sticking to the floor cannot easily be removed from the floor. The contaminant which remains on the floor after the cleaning by the floor cleaning machine need be removed by manual work.

The present invention has been made in consideration of the above matter. Its object is to provide a floor cleaning apparatus, which prevents environmental pollution by wear of the polisher brush or the floor material, improves the efficiency of cleaning the floor, and cleans the floor by removing the contaminant sticking on the floor.

According to the present invention, there is provided a floor cleaning apparatus which cleans a floor, the apparatus comprising: an apparatus main body, which has wheels and is configured to run on the floor; an electrolysis device, which is mounted in the apparatus main body and electrolyzes a cleaning water to alkaline water and acid water; a pressurizing pump, which is mounted in the apparatus main body, and sucks and pressurizes the alkaline water or acid water obtained by electrolysis by the electrolysis device; a spray nozzle mechanism, which is mounted in a front portion of the apparatus main body, and sprays the cleaning water comprising the alkaline water or acid water pressurized by the pressurizing pump on the floor; a suction mechanism, which is mounted behind the spray nozzle mechanism in the apparatus main body, has a suction nozzle that is opened to the floor, and sucks the cleaning water sprayed on the floor together with a contaminant; and a reservoir tank, which is mounted in the apparatus main body and stores the cleaning water sucked by the suction mechanism together with the contaminant.

Since the present invention does not use a rotary polisher, it provides an environmentally friendly floor cleaning apparatus which does not cause environmental pollution by wear of the polisher brush or the floor material. Further, since the cleaning solution containing alkaline water or acid water obtained through electrolysis is pressurized and sprayed on the floor, the contaminant adhering to the floor is efficiently removed and floated, and the cleaning solution sprayed on the floor is sucked by the sucking mechanism together with the contaminant. Therefore, the floor can be cleaned efficiently with high cleaning power and the water on the floor can be removed without wiping the floor. Moreover, since the cleaning solution can be selected from alkaline water and acid water, depending on the material of the floor or the floor covering on the floor or the kind of the contaminant, efficient cleaning suitable for the kind of the contaminant can be realized without discoloring the floor or the floor covering.

DETAILED DESCRIPTION OF THE INVENTION

Embodiments of the present invention will be described below with reference to the accompanying drawings.

Figure 1:
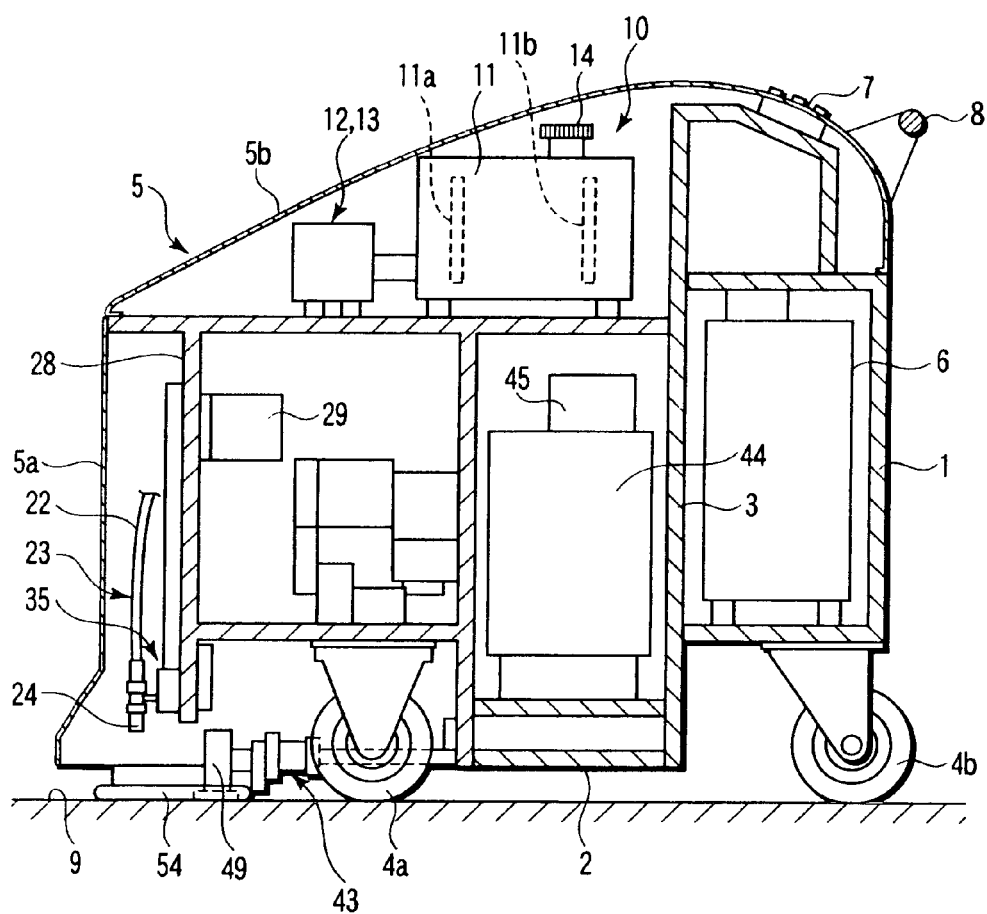
FIG. 1 is a cross sectional view showing a floor cleaning apparatus according to a first embodiment of the present invention.

FIGS. 1 to 4 show a first embodiment of a floor cleaning apparatus. As shown in FIG. 1, the floor cleaning apparatus has an apparatus main body 1, which is driven by, for example, commercial power of alternating current at 100V. The apparatus main body 1 has a frame 3 forming a bottom portion 2. Wheels 4a and 4b are provided at four corners of a lower surface of the bottom portion 2. The wheels 4a and 4b can perform forward and backward movement by a traveling motor (not shown). The apparatus main body 1 is covered with a cover 5 including a front cover 5a and an upper cover 5b, which are removably attached. A control box 6, connected to the commercial power, is mounted on a rear portion of the apparatus main body 1. An operation panel 7, including operation buttons to be operated by an operator, is provided above the control box 6. A handle 8 fixed to the apparatus main body 1 is provided above the operation panel 7.

Figure 2:
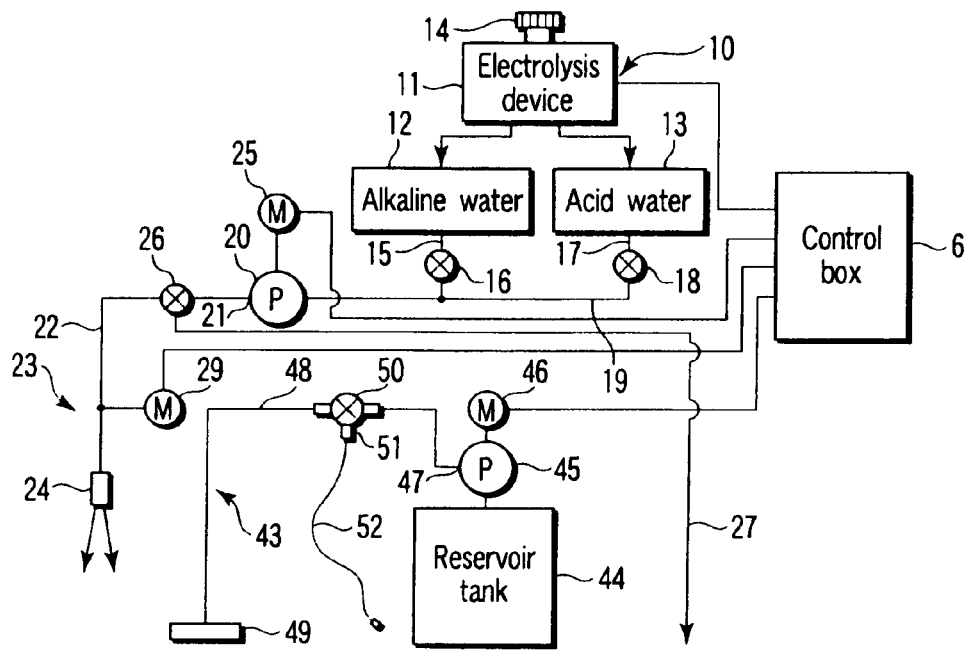
FIG. 2 is a piping diagram of the floor cleaning apparatus of the first embodiment.

Referring to FIG. 2, an electrolysis device 10 is provided on the frame 3 of the apparatus main body 1. In the electrolysis device 10, an electrolysis bath 11, provided with a positive electrode 11a and a negative electrode 11b, stores tap water to be electrolyzed, and a direct current is supplied across the two electrodes to carry out electrolysis, as described in, for example, Japanese Patent No. 3551288. Alkaline water obtained through the electrolysis is temporarily stored in an alkaline water tank 12, and acid water is temporarily stored in an acid water tank 13. The electrolysis bath 11 has a water supply port 14, through which tap water is supplied.

An alkaline water supplying pipe 15, connected to the alkaline water tank 12, has an open/close valve 16 formed of a solenoid valve. An acid water supplying pipe 17, connected to the acid water tank 13, has an open/close valve 18 formed of a solenoid valve. The alkaline water supplying pipe 15 and the acid water supplying pipe 17 are connected to a common pipe 19. The common pipe 19 is connected to a pressurizing pump 20. The pressurizing pump 20 is inserted in a middle portion of the common pipe 19. A discharge port 21 of the pressurizing pump 20 is connected to a spray nozzle 24 through a water supply hose 22 and a spray nozzle mechanism 23. The pressurizing pump 20 is driven by a first motor 25 connected to the control box 6. A switch valve 26 formed of a solenoid valve is inserted in a middle portion of the water supply hose 22. The switch valve 26 is connected to a drain pipe 27.

Figure 3:
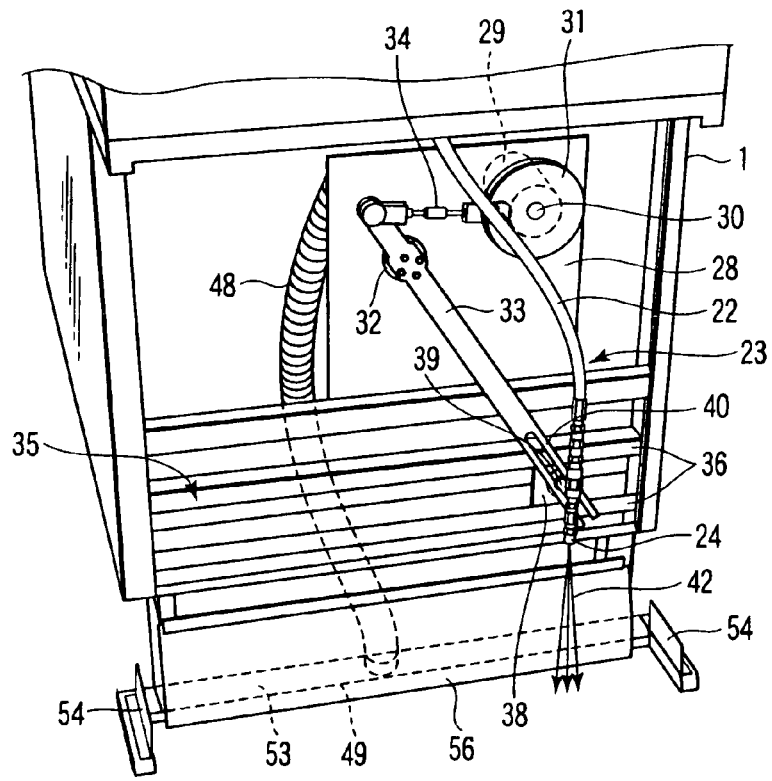
FIG. 3 is a perspective view showing a state in which a front cover of the floor cleaning apparatus of the first embodiment is removed.
Figure 4:
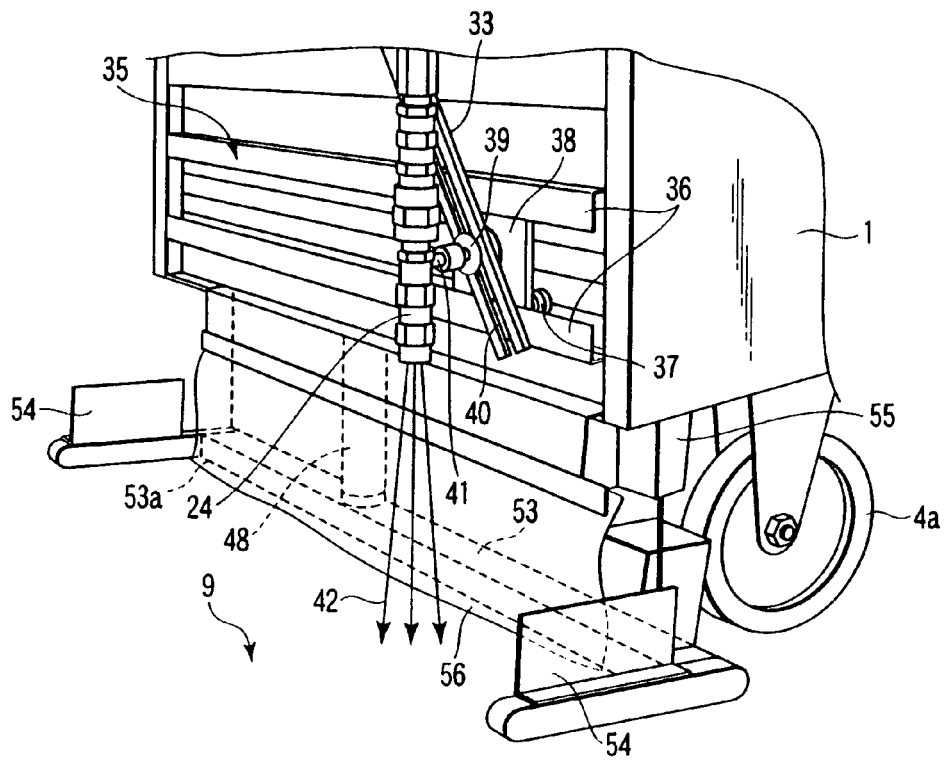
FIG. 4 is a perspective view showing a state in which a front cover of the floor cleaning apparatus of the first embodiment is removed.

The spray nozzle mechanism 23 is configured as shown in FIGS. 3 and 4. A front frame 28 is provided in a front portion of the apparatus main body 1. A second motor 29 connected to the control box 6 is fixed to the front frame 28 with a rotation shaft 30 directed forward from the apparatus main body 1. A disk-shaped rotary body 31 is fitted around the rotation shaft 30. The front frame portion 28, located beside the rotary body 31, is provided with a rotary arm 33 pivoted about a pivot shaft 32 so as to freely reciprocate. An upper end portion of the rotary arm 33 and a circumferential edge portion of the rotary body 31 are coupled by a coupling rod 34. Rotary motion of the coupling rod 34 causes cranking motion of the rotary body 31. The cranking motion makes the rotary arm 33 rotate left and right about the pivot shaft 32.

A linear guide 35 extending laterally is set under the front frame 28. The linear guide 35 is constituted by a pair of guide rails 36, having a U-shaped cross section. A support member 38 having a roller 37 is supported between the paired guide rails 36 so as to freely reciprocate linearly. A flanged cam roller 39 projecting forward through a gap between the paired guide rails 36 is fixed to the support member 38. A guide groove 40 is formed in a lower end portion of the rotary arm 33 along the longitudinal direction thereof. The cam roller 39 slidably fits in the groove 40. The rotary motion of the rotary arm 33 causes the support member 38, guided by the linear guide 35, to linearly reciprocate in the width direction of the apparatus main body 1. The cam roller 39 fixed to the support member 38 has a support shaft 41. The spray nozzle 24 is vertically connected to the support shaft 41 such that its spray port is directed to a floor 9. Thus, a cleaning water 42 pressurized by the pressurizing pump 20 is sprayed on the floor 9.

Further, as shown in FIG. 2, the apparatus main body includes a suction mechanism 43. The suction mechanism 43 has a reservoir tank 44 and a suction pump 45 removably mounted on the frame 3. The suction pump 45 is driven by a third motor 46 connected to the control box 6. A suction port 47 of the suction pump 45 is connected to a suction nozzle 49 via a suction pipe 48, through which the cleaning water on the floor 9 is sucked together with the contaminant and stored in the reservoir tank 44.

A manually operated three-way valve 50 is provided in a middle portion of the suction pipe 48. The three-way valve 50 has a suction connecting port 51. A suction hose 52 is removably connected to the suction connecting port 51. The operator holds the suction hose 52 to suck dusts and the cleaning water in corners of the floor 9 together with the contaminant. Thus, in the corners of the floor 9 or a part where the apparatus main body 1 cannot enter because of an obstacle, dusts and the cleaning water in corners of the floor 9 can be sucked together with the contaminant through the suction hose 52 connected to the suction connecting port 51 held by the operator.

As shown in FIG. 4, the suction nozzle 49 is located behind the spray nozzle 24 in a lower portion of a frame 4 of the apparatus main body 1. Moreover, the suction nozzle 49 extends over the apparatus main body 1 in the width direction. The suction nozzle 49 includes a nozzle body 53, which has a suction port 53a facing the floor 9 and having an elongated opening extending along the width direction of the apparatus main body.

Blocking plates 54, which project upward from both side ends of the apparatus main body 1, are fixed to both end portions in the longitudinal direction of the nozzle main body 53. The blocking plates 54 prevent the cleaning water sprayed on and splashed by the floor 9 from scattering. Thus, in the suction nozzle 49, the nozzle main body 53 and the blocking plates 54 provided at both ends in the longitudinal direction thereof form a U shape, which opens frontward in a plan view. Further, the suction nozzle 49 is supported so as to move up and down by an actuator 55, such as a solenoid, which is connected to the control box 6. More specifically, when the main body apparatus 1 is carried or moved (when it is simply moved on the floor 9), the suction nozzle 49 can be moved up by the actuator 55 above the floor 9, so that the suction nozzle 49 may not hit on an obstacle on the floor 9. When the main body apparatus is used (when it cleans the floor 9), the suction nozzle 49 is moved down by the actuator 55 to be close to the floor 9, so that the cleaning water on the floor 9 can be efficiently sucked together with the contaminant. Furthermore, a scattering preventing sheet 56, an upper end of which is fixed to the frame 3, is hanging down in front of the nozzle main body 53 of the suction nozzle 49. The scattering preventing sheet 56 prevents the cleaning water 42 sprayed by the spray nozzle 24 from scattering toward the suction nozzle 49.

Operations of the floor cleaning apparatus as described above will now be described.

The operator holds the handle 8, operates the operation panel 7 to drive wheels 4a and 4b, and moves the apparatus main body 1 forward. Thus, the operator can moves the apparatus main body 1 to a desired position on the floor 9. While the operator is moving the apparatus main body 1 on the floor 9, he/she operates the operation panel 7 to supply power to the electrolysis device 10 and drive the pressurizing pump 20. When the current is caused to flow across the positive electrode 11a and the negative electrode 11b of the electrolysis device 10, the tap water stored in the electrolysis bath 11 is electrolyzed into alkaline water and acid water. The alkaline water obtained through the electrolysis is temporarily stored alkaline water tank 12, and the acid water is temporarily stored in the acid water tank 13.

Assuming that the alkaline water is used as the cleaning water 42, the open/close valve 16 is opened and the open/close valve 18 is closed. The cleaning water 42 formed of the alkaline water stored in the alkaline water tank 12 is guided to the pressurizing pump 20 through the common pipe 19, and pressurized by the pressurizing pump 20. The pressurized cleaning water 42 of high pressure is supplied to the spray nozzle 24 through the water supply hose 22 and sprayed on the floor 9. Since the cleaning water 42 has high pressure, the contaminant adhering to the floor 9 is removed from the floor 9.

At this time, the second motor 29 is driving; therefore, the rotary body 31 rotates, resulting in that the rotary body 31 and the coupling rod 34 performs the crank motion. In association with this motion, the rotary arm 33 rotates about the pivot shaft 32. By the rotation of the rotary arm 33, the support member 38, guided by the linear guide 35, makes a linear reciprocating motion in the width direction of the apparatus main body 1. Thus, the spray nozzle 24 reciprocates in the lateral direction at a fixed distance from the upper surface of the floor 9. Therefore, the pressure applied to the floor 9 is constant along the width direction, and the cleaning water 42 can be sprayed widely on the floor 9. Since the cleaning water is alkaline, it exhibits strong cleaning power against stains including oil and proteins and removes the contaminant adhering to the floor 9.

Further, the suction pump 45 is driving by means of the third motor 46. Therefore, the suction nozzle 49 located behind the spray nozzle 24 can suck the water on the floor 9 together with the contaminant. At this time, since the suction nozzle 49 is lowered by the actuator 55 in close proximity to the floor 9, the water on the floor 9 can be efficiently sucked together with the contaminant. Thus, substantially all water on the floor 9 can be sucked. Therefore, it is unnecessary to wipe the water on the floor 9, as required in work of the conventional art. Furthermore, since the blocking plates 54 is provided on both sides of the suction nozzle 49 to prevent the cleaning water 42 sprayed on and splashed by the floor 9 from scattering, the cleaning water 42 never scatters out of the lower end portion of the cover 5.

Thus, the operator only needs to move the apparatus main body 1 holding the handle 8, to spray the pressurized cleaning water 42 to the floor 9 through the spray nozzle 24, remove the contaminant adhering to the floor 9, suck the contaminant removed from the floor 9 together with the water by the suction nozzle 49, and store it in the reservoir tank 44.

When the electrolysis bath 11 becomes empty, the cleaning is temporarily stopped, and the tap water is supplied to the electrolysis bath 11 through the water supply port 14. When the reservoir tank 44 becomes full of dirty water containing contaminant, the cleaning is temporarily stopped, and the dirty water containing the contaminant is drawn out of the reservoir tank 44.

In the case described above, the alkaline water obtained through the electrolysis by the electrolysis device 10 is used as the cleaning water. However, in a case where the alkaline water cannot be used depending on the material of the floor or floor covering, the open/close valve 16 is closed and the open/close valve 18 is opened, so that the acid water in the acid water tank 13 can be supplied to the pressurizing pump 20.

After the cleaning is completed, when the alkaline water and the acid water remaining in the electrolysis device 10 are to be discharged to sewerage or the like, the open/close valves 16 and 18 are opened, at the same time the switch valve 26 is switched to the drain side. Thus, the mixture of the alkaline water and the acid water can be drained through the drain pipe 27.

Further, in the embodiment described above, the alkaline water or acid water is used as the cleaning water. However, cleaner bottles containing a plurality of different kinds of cleaners may be mounted on the apparatus main body 1, so that a cleaner suitable for the material of the floor or floor covering or the degree of contamination can be mixed with the cleaning water, and the cleaning water containing the cleaners can be sprayed to the floor 9 through the spray nozzle 24.

Figure 5:
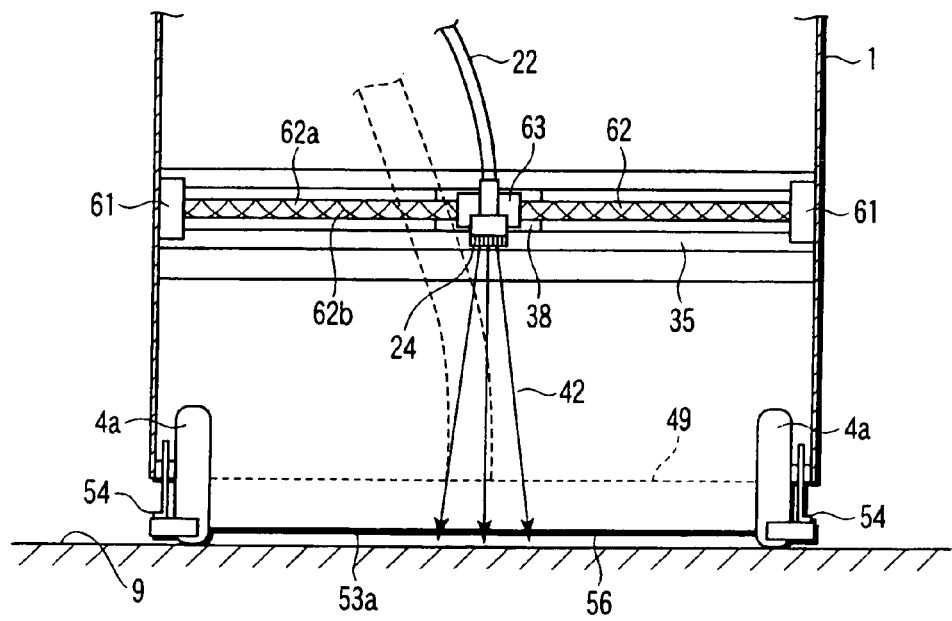
FIG. 5 is a front view showing a state in which a front cover of a floor cleaning apparatus of a second embodiment is removed.

FIG. 5 shows a second embodiment. The same components as those of the first embodiments are identified by the same reference numerals as in the first embodiment, and the descriptions thereof are omitted. Bearings 61 facing each other are provided on left and right side portions in a front portion of the apparatus main body 1. A ball screw shaft 62 is provided across the bearings 61 along the width direction of the apparatus main body 1. The ball screw shaft 61 has a right screw 62a and a left screw 62b, which are cut in the shaft portion to cross each other. The ball screw shaft is rotated by a servo motor (not shown). A nut portion 63 to be engage with the right screw 62a and the left screw 62b is fit on the ball screw shaft 62, thus constituting a ball screw mechanism.

The nut portion 63 is fixed to the support member 38, which is supported by the linear guide 35 so as to be freely movable linearly. The spray nozzle 24 is fixed to the nut portion 63. When the nut portion 63 engaged with the right screw 62a moves to the right according to the rotation of the ball screw shaft 62 and reaches the one end of the ball screw shaft 62, the nut portion 63 engages with the left screw 62b and moves to the left. Thus, the spray nozzle 24 linearly reciprocates in the width direction of the apparatus main body 1. In other words, the spray nozzle 24 reciprocates laterally, while keeping a fixed distance from the upper surface of the floor 9. Therefore, the pressure of the cleaning water from the spray nozzle 24 against the floor 9 is constant across the apparatus main body 1 in the width direction.

Figure 6:
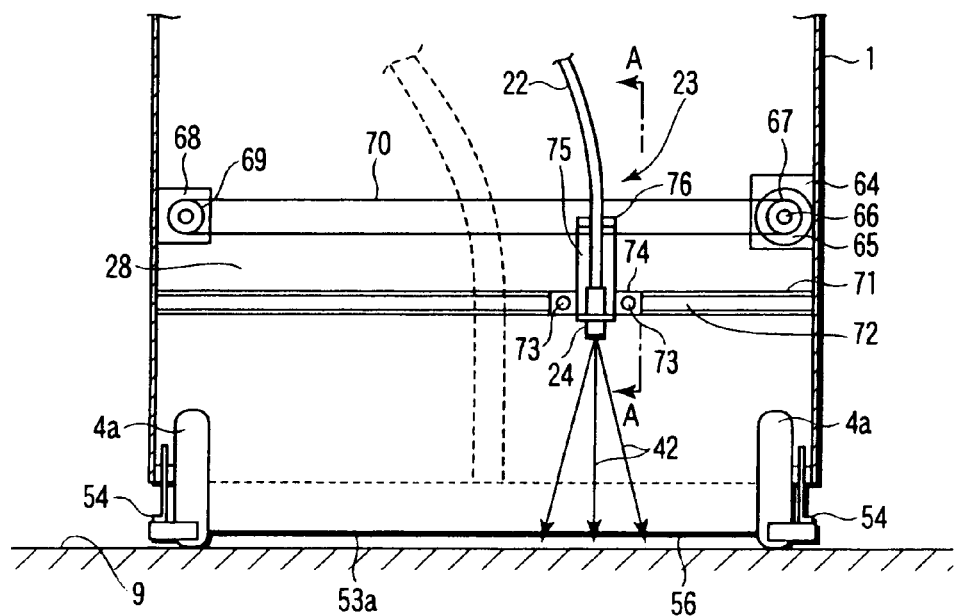
FIG. 6 is a front view showing a state in which a front cover of a floor cleaning apparatus of a third embodiment is removed.
Figure 7:
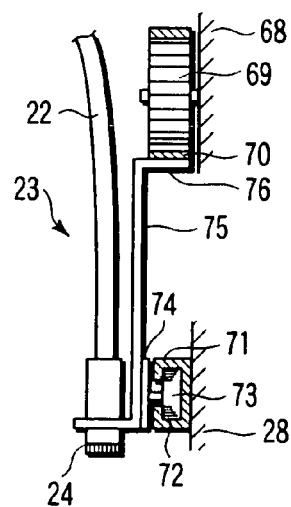
FIG. 7 is a sectional view showing the third embodiment taken along the line A-A in FIG. 6.

FIGS. 6 and 7 show a third embodiment. The same components as those of the first embodiments are identified by the same reference numerals as in the first embodiment, and the descriptions thereof are omitted. A motor bracket 64 is provided on one side in the left-right direction in a front portion of the apparatus main body 1. A motor 65, which can rotate forward and reverse, is fixed to the motor bracket 64 such that a rotation shaft 66 thereof is directed frontward. A driving pulley 67 is attached to the rotation shaft 66. A pulley bracket 68 is provided on the other side in the left-right direction in the front portion of the apparatus main body 1, and a driven pulley 69 is attached to the pulley bracket 68. A timing belt 70 is extended laterally across the driving pulley 67 and the driven pulley 69.

A linear guide 71 is provided in the front frame 28 under the timing belt 70 in the lateral direction. The linear guide 71 has a guide groove 72, by which a movable member 74 having a roller 73 is supported so as to freely reciprocate linearly. A nozzle supporting member 75 is attached to the movable member 74. The spray nozzle 24 is vertically connected to the nozzle support member 75 such that its spray port is directed to the floor 9. Thus, the cleaning water 42 pressurized by the pressurizing pump 20 is sprayed on the floor 9. A connecting portion 76 is provided on the upper end of the nozzle support member 75. The connecting portion 76 is connected to a middle portion of the timing belt 70.

Therefore, when the driving pulley 67 is rotated forward and reversely, the timing belt 70 reciprocates left and right. Accordingly, the spray nozzle 24 connected to the timing belt 70 via the nozzle support member 75 reciprocates linearly in the width direction of the apparatus main body 1. Thus, since the spray nozzle 24 reciprocates laterally, while keeping a fixed distance from the upper surface of the floor 9, the pressure of the cleaning water from the spray nozzle 24 against the floor 9 is constant across the apparatus main body 1 in the width direction.

The present invention is not limited to the above-mentioned embodiments alone and the structural elements can be variously modified when practiced without departing from the scope of the invention. Further, some of the plurality of structural elements of the above embodiments described above may be suitably combined, so that various inventions may be achieved. For example, some of the structural elements may be deleted from all structural elements of an embodiment. Furthermore, structural elements of different embodiments may be suitably combined.

The floor cleaning apparatus of this invention is applicable to clean a floor of a large area, for example, a lobby or passageway of a building or apartment house, or a station yard, platform or underground passageway.

What is claimed is:

1. A floor cleaning apparatus which cleans a floor, the apparatus comprising:
    an apparatus main body, which has wheels and is configured to run on the floor;
    an electrolysis device, which is mounted in the apparatus main body and electrolyzes a cleaning water to alkaline water and acid water;
    a pressurizing pump, which is mounted in the apparatus main body, and sucks and pressurizes the alkaline water or acid water obtained by electrolysis from the electrolysis device;
    a spray nozzle mechanism, which is mounted in a front portion of the apparatus main body, and sprays the cleaning water comprising the alkaline water or acid water pressurized by the pressurizing pump on the floor;
    a suction mechanism, which is mounted behind the spray nozzle mechanism in the apparatus main body, has a suction nozzle that is opened to the floor, and sucks the cleaning water sprayed on the floor together with a contaminant; and
    a reservoir tank, which is mounted in the apparatus main body and stores the cleaning water sucked by the suction mechanism together with the contaminant,
    wherein said spray nozzle mechanism comprises: a rotary body rotated by a motor; a rotary arm which reciprocates in association with the rotary body; a linear guide which extends across the front portion of the apparatus main body in a width direction thereof; a support member which is supported by the linear guide and linearly reciprocates in the width direction of the apparatus main body; and a single spray nozzle which is fixed to the support member, linearly reciprocates in the width direction of the apparatus main body across substantially the entire width of the main body while keeping a fixed distance from the floor, and sprays the cleaning water on the floor.

2. The floor cleaning apparatus according to claim 1, wherein the electrolysis device comprises an electrolysis bath containing the cleaning water to be electrolyzed, a positive electrode plate and a negative electrode plate which are arranged in the electrolysis bath and electrolyze the cleaning water, and tanks which temporarily stores independently the alkaline water and the acid water obtained by the electrolysis.

3. The floor cleaning apparatus according to claim 1, wherein the suction nozzle is attached to the apparatus main body so as to move up and down, lowers close to the floor during suction, and sucks the cleaning water sprayed by the spray nozzle mechanism together with the contaminant to store the sucked cleaning water and contaminant in the reservoir tank.

4. The floor cleaning apparatus according to claim 1, further comprising blocking plates, which are fixed to both sides of the suction mechanism and prevent the cleaning water sprayed on and splashed by the floor from scattering to both sides of the apparatus main body, wherein the blocking plates move up and down along with the suction nozzle.

\* \* \* \* \*